United States Patent
Lyle et al.

(10) Patent No.: US 6,651,073 B1
(45) Date of Patent: Nov. 18, 2003

(54) METHOD AND APPARATUS FOR INSURING DATABASE DATA INTEGRITY WITHOUT DATA RECOVERY LOGGING

(75) Inventors: Robert W. Lyle, Morgan Hill, CA (US); James Z. Teng, San Jose, CA (US); Jay A. Yothers, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/576,667

(22) Filed: May 23, 2000

(51) Int. Cl.[7] ............................................. G06F 17/30
(52) U.S. Cl. ........................... 707/202; 707/1; 707/10; 707/8; 707/200
(58) Field of Search ........................... 707/1, 10, 200, 707/202, 8

(56) References Cited

U.S. PATENT DOCUMENTS

| | | | |
|---|---|---|---|
| 4,868,744 A | | 9/1989 | Reinsch et al. |
| 5,333,303 A | * | 7/1994 | Mohan ........................ 395/575 |
| 5,574,902 A | * | 11/1996 | Josten et al. ................... 707/1 |
| 5,586,312 A | * | 12/1996 | Johnson et al. ................. 707/8 |
| 5,625,820 A | | 4/1997 | Hermsmeier et al. |
| 5,649,185 A | * | 7/1997 | Antognini et al. ............. 707/9 |
| 5,680,610 A | * | 10/1997 | Smith et al. ................... 707/10 |
| 5,721,918 A | * | 2/1998 | Nilsson et al. ............... 707/202 |
| 5,781,910 A | * | 7/1998 | Gostanian et al. ........... 707/201 |
| 5,794,229 A | | 8/1998 | French et al. |
| 5,907,848 A | * | 5/1999 | Zaiken et al. ................ 707/202 |
| 6,012,094 A | * | 1/2000 | Leymann et al. ........... 709/230 |
| 6,018,746 A | * | 1/2000 | Hill et al. .................... 707/202 |
| 6,085,200 A | * | 7/2000 | Hill et al. .................... 707/202 |
| 6,161,198 A | * | 12/2000 | Hill et al. ....................... 714/15 |
| 6,173,292 B1 | * | 1/2001 | Barber et al. ............... 707/200 |
| 6,502,133 B1 | * | 12/2002 | Baulier et al. .............. 709/224 |

OTHER PUBLICATIONS

Spiro, Peter M. et al., "Designing an Optimized Transaction Commit Protocol", Digital Technical Journal, vol. 3, No. 1, Winter 1991.

* cited by examiner

Primary Examiner—Frantz Coby
(74) Attorney, Agent, or Firm—Kudirka & Jobse, LLP

(57) ABSTRACT

Database tables which are to be loaded with large data objects are defined with a special logging attribute that causes the associated database management system to suspend recovery logging for the databases so defined, but to continue with logging control information, such as space management changes. During a two-phase commit operation for a database transaction in a distributed system, at each database all modified data pages are written to disk before the end of the phase 1 commit, if the pages have not been previously written. This and other write operations are monitored for errors. If any of the changed data pages cannot be written to disk successfully before the end the phase 1 commit operation, then the transaction is rolled back at all databases.

28 Claims, 8 Drawing Sheets

METHOD AND APPARATUS FOR INSURING DATABASE DATA INTEGRITY WITHOUT DATA RECOVERY LOGGING

FIELD OF THE INVENTION

The present invention relates generally to data recovery in a database management system after an abnormal system termination and, more specifically, to a database management system recovery method and apparatus that does not use data recovery logging.

BACKGROUND OF THE INVENTION

Databases store data in a variety of manners depending on the internal organization. For example, a relational database system typically stores data in tables. The tables are comprised of rows, each of which contains a record. The record, in turn, contains fields and the fields contain the actual related data values for a data "object." Each table may also be associated with one or more indexes, which provide rapid access to the rows in an order determined by the index and based on key data values contained in selected fields in each row. As an example, a row might be associated with each employee of an organization and contain fields that hold such information as the employee name, an identification number, and telephone numbers. One index might order the rows numerically by employee identification number, while another index might order the rows alphabetically by employee name.

Such a database conventionally includes methods that insert and delete rows and update the information in a row. When changes are made to the rows, any database indexes associated with the table may also need to be updated in order to keep the indexes synchronized with the tables. The rows in each table are mapped to a plurality of physical pages on the disk to simplify data manipulation. Such an arrangement is illustrated in FIG. 1.

In FIG. 1, table 100, which illustratively consists of rows 112, 114, 116, and 118, is mapped to a chain of pages which pages 120, 138, and 132 are shown. In the table illustrated, each row consists of five separate fields. For example, row 112 consists of fields 102, 104, 106, 108 and 110. The fields in each of rows 112, 114, 116 and 118 are mapped illustratively to page 138, which can contain data for more than one row. For example, field 102 maps to location 126 in page 138. Fields 104 maps to location 128. Field 106 maps to location 130. In a similar manner field 108 maps to location 124 and field 110 maps to location 134. The fields in the next row 114 are mapped directly after the fields in row 112. For example, field 111 is illustrated which maps to page location 136. When the page is completely filled with data, field information is mapped to the next page in the page chain. The pages are chained together by means of page pointers. For example, page pointer 122 links pages 120 and 138, whereas page pointer 140 links pages 138 and 132. All of the pages used to store the data in table 100 are linked together in a similar manner in a page chain.

The data pages are normally kept in a page buffer pool located in system memory. In order to make such a database system persistent or "durable", the data pages must be written to an underlying non-volatile storage system, such as disk storage. This storage operation takes place on a page level so that when a modification is made to data on a page the entire page is stored in the persistent storage. Each page could be copied to the persistent storage as soon as data on the page was modified. However, this immediate copying greatly slows the system operation since persistent storage is generally much slower than RAM memory. Alternatively, the information in modified pages in the buffer pool can be copied or "flushed" to the disk storage at intervals. For example, the information could be flushed periodically or when the number of changed pages in the buffer pool reaches some predetermined threshold. During this disk flushing operation, the data modifications are performed "in place" so that the old data is either overwritten or deleted from the disk and lost.

Since the data is lost during the modification process, in order to ensure data integrity in the case of a system failure, or crash, the actions performed on the database are grouped into a series of "transactions". Each transaction is "atomic" which means that either all actions in the transaction are performed or none are performed. The atomic property of a transaction ensures that the transaction can be aborted or "rolled back" so that all of the actions that constitute the transaction can be undone. Database transactions commonly have a "commit" point at which time it can be guaranteed that all actions which comprise the transaction will complete properly. If the transaction does not reach the commit point, then it will be rolled back so that the system can return to its state prior to the initiation of the transaction. Consequently, if there is a system termination or crash prior to the commit point, the entire transaction can be rolled back.

The use of a buffer pool complicates transaction processing because although a transaction has committed, system operation could terminate after a page has been modified, but before the modified page is flushed to disk. In order to prevent data loss caused by such a system interruption, a logging system is used to permit data recovery. The logging system records redo and undo information for each data modification in a special file called a "recovery log" that is kept in non-volatile storage.

The recovery log consists of an ordered list of redo/undo actions and contains information such as a transaction ID, a page ID, an offset length and the old and new data constituting the update. Additional control information is often included to facilitate the logging operation. This control data includes a transaction table that includes one record per active transaction that contains the transaction state (for example, running, committed or aborted.) The control information also includes a dirty page table that contains one entry for each page in the buffer pool that has been modified.

In order to ensure both atomicity and persistence for each transaction, a "write ahead" logging protocol is used. According to this protocol a log record is written for an update before the corresponding modified data page is written to disk. In addition, all log records are written for a transaction before the transaction is committed.

In addition to the recovery logging of data update information, recovery logging is also performed during storage space management procedures that involve allocation and deallocation of data pages for each database row. For example, a set of pages is commonly maintained by the database system to handle storage space allocation and deallocation for each table. These pages are referred to as a space map, free space, a free space map or unused space. The term "space map" will be used herein to refer to all such space allocation areas and structures. In general, each space-map page manages space allocation for a range of data pages and contains status information that indicates whether a particular data page on disk storage has been used. When a new data row is inserted into a table, the space-map pages associated with that table are examined and updated to allocate space for a page, or the part of a page, which holds the row. A recovery log entry is written for each change made to the space-map pages. These recovery logs can be used to free the allocated space if a transaction roll back occurs before the transaction has been committed.

The recovery logs are used to restart processing if system operation is abnormally terminated, for example, due to a power failure. In a recovery operation, redo information in the recovery log is used to reconstruct all transactions at the time of the failure. The undo information is used to undo transactions that did not commit prior to the termination.

The conventional database system is somewhat complicated in a distributed database system such as shown in FIG. 2 which illustrates, in schematic form, an example of such a distributed database system. The system consists of four database management systems 200, 202, 204 and 206. Each of these database management systems 200–206 contains a replicated copy of data that is in use throughout the system. Each of the database management systems communicates with, and is accessed by, a plurality of users. For example, database management system 200 may interact with a plurality of users, of which three users 208–212, are shown. Similarly, database management system 204 interacts with users 214–218. Database management system 202 interacts with users 220 and 224 and database management system 206 services users 226–230. Other configurations and numbers of users are within the spirit and scope of the invention.

In such a system, copies of the data maybe maintained on the databases in order to speed up access of the database by the users. In order to ensure data integrity in such a system, it is necessary to ensure that a transaction that affects data that has been replicated on several systems commits in each of the systems. For example, a transaction that affects data stored in system 200 must also be communicated to and commit on systems 202–206. A two-phase commit procedure is used to ensure that the transaction completes in each system. Unlike non-distributed databases where a single change is, or is not, made locally, all participating databases in the distributed database system must all commit, or all roll back, a transaction if there is a system or network failure at a single database. The two-phase commit procedure has two distinct processes that are accomplished in order. The first process occurs in a so-called "prepare" phase where a global coordinator or initiating database requests that all distributed databases agree to commit or roll back a transaction. In most distributed database systems, depending on the transaction, any database could serve as the global coordinator. If not all participants can prepare the transaction for commitment, the global coordinator will instruct all databases to roll back the transaction.

The second portion of the two-phase commit procedure is the actual commit phase that occurs after all participants have responded to the coordinator that they are prepared to commit a transaction. In the commit phase, the coordinator requests that all databases commit the transaction. If there is a machine, network or software failure that occurs during the two-phase commit process, the transaction tables in each database are used by the recovery process to resolve the status of any transaction.

The aforementioned recovery system works well with most database systems. However, for a table that is used to store large data objects, for example, images, large text documents, digitized video or digitized audio data (called "large objects" or LOBs), a single row could comprise many megabytes or even gigabytes. Since a data page is generally limited to 4000 bytes, a single such row must be mapped to many data pages. Such an arrangement is shown in FIG. 3 that has been simplified for clarity. In FIG. 3, table 300, of which rows 306, 308, 310, and 312 are shown, is used to store data objects, including large data objects. For example, row 306 has a data object 302 and a large data object 304. Data object 304 may consist of many megabytes and therefore must be mapped to several pages. These pages can be connected together in a page chain as shown in FIG. 3. For example, page 318 stores a portion of the data object F2. The remainder of the F2 object is stored in page chain of which pages 314 and 322 are shown. This page chain is connected together with page pointers. For example, page pointer 316 points to page 318 and page pointer 320 points to page 322.

A space map associated with the table data illustrated in FIG. 3 is shown in FIG. 4. The map 400 can be associated with a page chain of which pages 414, 416, 418 and 420 are shown. The page chain is connected together with page pointers. For example, page pointer 422 points to page 416, page pointer 424 points to page 418 and page pointer 426 points to page 420. The space map 400, which may be contained within one or more pages itself, contains data sections relating to each data page which can be used in the table. For example, data section 402 relates to page 414, data section 404 relates to page 416, data section 408 relates to page 418 and data section 410 relates to page 420. Data section 406 relates to a page that is not currently in the page chain, for example, an unused page. Each data section contains information relating to its associated page. This information may be as simple as a single bit indicating whether the associated page is unused (free) or used. Other information relating to the page can also be included in each data section. When table rows are added, the space map is searched to find a new page that is unused or an existing page that has space for the new row. When found, a new page is added to the page chain and the associated data section in the space map 400 is marked to indicate that the page has been used. If an existing page is used, the space map 400 is marked to indicate that a previously unused section is now used. Conversely, if a table row is deleted, the data sections corresponding to the pages which store the data from the row are marked to indicate the associated pages are free. In order to allow for recovery, a recovery log is kept of all changes made to the space map. During rollback, changes to the space map can be reversed by sequentially applying "undo" operations to the space map from the log.

When a table is initially populated with these large data objects using the conventional row insert methods, the recovery logs, which typically include the new data which is inserted into the table, are also very large. It is difficult for a conventional database management system to manage such large recovery logs. Logging such large amounts of data not only slows the time to complete this load process, but also impacts the system's overall performance due to contentions for logging devices and the overhead required to manage log archiving. One way to improve loading performance is to use parallel insert jobs. However, many database management systems support only a single log stream, and, in these systems, logging becomes a bottleneck.

One prior art solution to this problem is to provide an option to turn off logging for such types of tables during the loading process. However, the data inserted to such tables may be lost if a system termination occurs before the data pages in the page buffer pool are eventually flushed to persistent storage.

Another prior art solution is to use a special database load utility to load the data without logging, instead of using the normal insert method to populate the table. However, the load utility process is a single thread process on the entire table and, consequently, it prevents concurrent read/write access by other applications during the loading process. Further, if any type of error occurs during the load process, the newly loaded data must be deleted and completely reloaded.

Therefore, it is desirable to provide a method and apparatus which can load a database table with large objects without requiring recovery logging and yet be able to recover the loaded data if an abnormal system termination occurs at a subsequent time.

SUMMARY OF THE INVENTION

In accordance with the principles of the invention, database tables which are to be loaded with large data objects are defined with a logging attribute which can be used to enable recovery logging and space map logging or to suspend recovery logging, but to continue with space management logging. During a two-phase commit operation for a transaction in a distributed system, the present invention insures that, at each database, all modified data pages are written to disk before the end of the phase 1 commit, if the pages have not been previously written. This write operation is monitored for errors. If any of the changed data pages cannot be written to disk successfully before the end the phase 1 commit operation, then the transaction will be rolled back at all databases. During rollback, the recovery log is used to undo changes to the space map, thereby deleting large data objects that were inserted without data logging. This frees the memory used by the inserted objects.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

Figure 5:
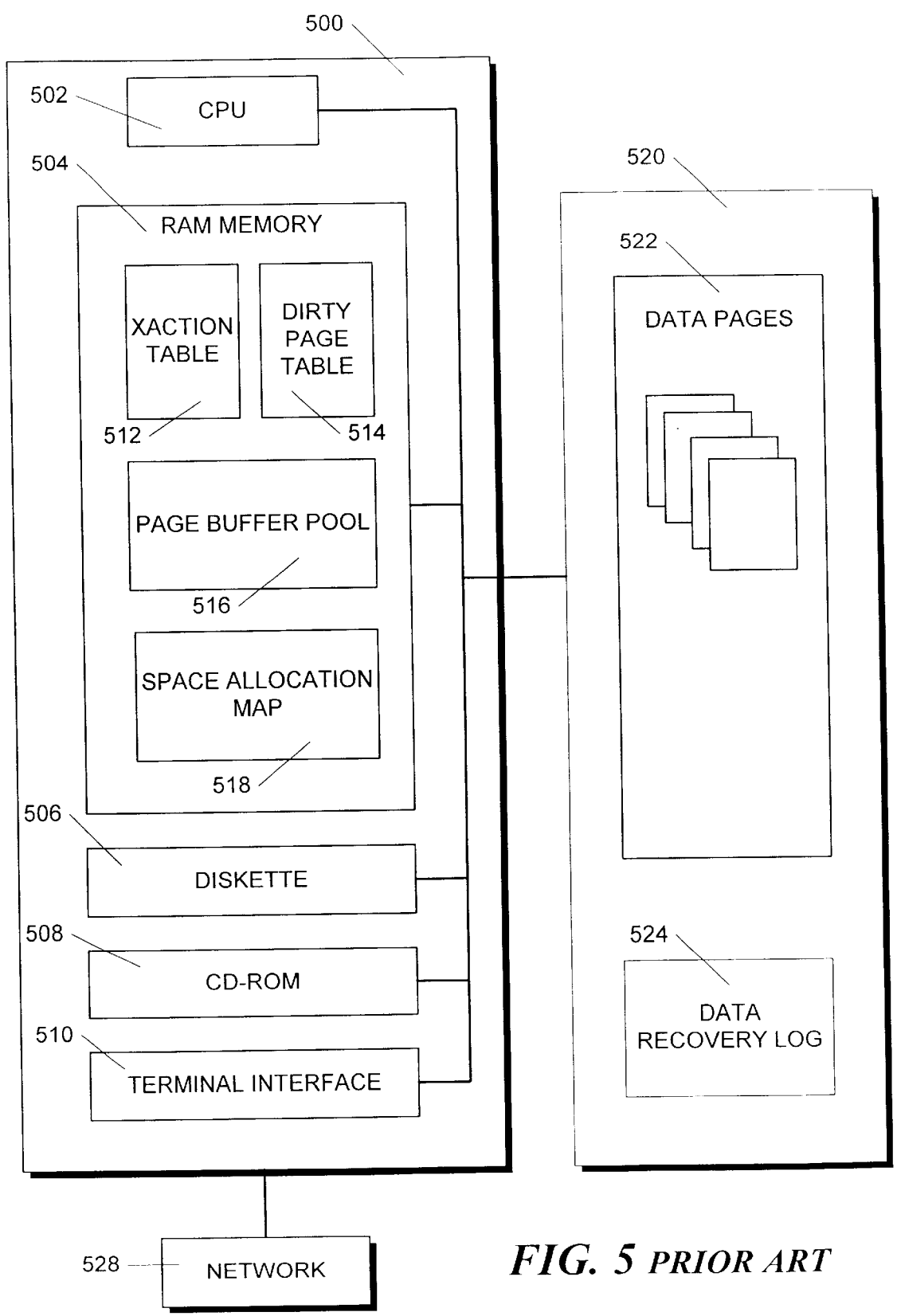
FIG. 5 shows a computer system on which the invention can be implemented.

FIG. 5 is a block diagram of a typical computer system suitable for operation with an illustrative embodiment of the present invention. For example, computer system 500 could be an IBM application system/400 mid-range computer; however, other systems, such as personal computers and mainframe computer systems, may also be utilized. Computer system 500 conventionally contains a CPU 502, a memory 504 and a terminal interface 510 and may also contain a diskette drive 506 and a CD-ROM drive 508. Terminal interface 510 allows developers and users to communicate with computer system 500, normally through a programmable workstation.

The CPU 502 is controlled by an operating system loaded into memory 504. Such an operating system may be a commercially available system such as OS/390 V6, offered by International Business Machine, Inc, of Armonk, N.Y. A database management system (DBMS) is also loaded into memory 504 that, together with the operating system controls the computer system to manage a database. An example of such a DBMS is a commercially available database system such as DB2 for OS/390 V6, also provided by IBM, Inc.

When the computer system is used as a database management system, the memory 504 contains the transaction table 512 which, as previously mentioned, includes one record per active transaction that contains the transaction state (for example, running, committed or aborted.) The memory 504 also includes a page buffer pool 516 that contains the data pages that store the data for a database table on disk and a dirty page table 514 which contains one entry (per modifying agent) for each page in the buffer pool 516 which has been modified. A space allocation map 518 stores on disk a set of space-map pages which contain status information that indicates whether a particular data page in disk storage has been used.

The computer system 500 is generally connected to a non-volatile storage unit 520 that is used as a secondary memory. Unit 520 may be a magnetic disk drive, an optical storage device, or a well-known combination of different conventional storage devices. While storage 520 is shown as a monolithic entity, it should be understood that it may comprise a variety of devices and that all programs and files shown will not necessarily be contained in any one device. It may, for example, comprise a disk farm or other distributed storage system without departing from the spirit and scope of the present invention.

The storage unit 520 typically contains the data pages that store the data that is part of the database. During operation data in the page buffer pool 516 will be stored or "flushed" to the data pages in the storage unit 522 to insure that the data is persistent.

The storage unit 520 may also contain a conventional recovery log which allows recovery of data which is in the page buffer pool 518, but has not been flushed to storage 520 prior to a system termination.

Figure 1:
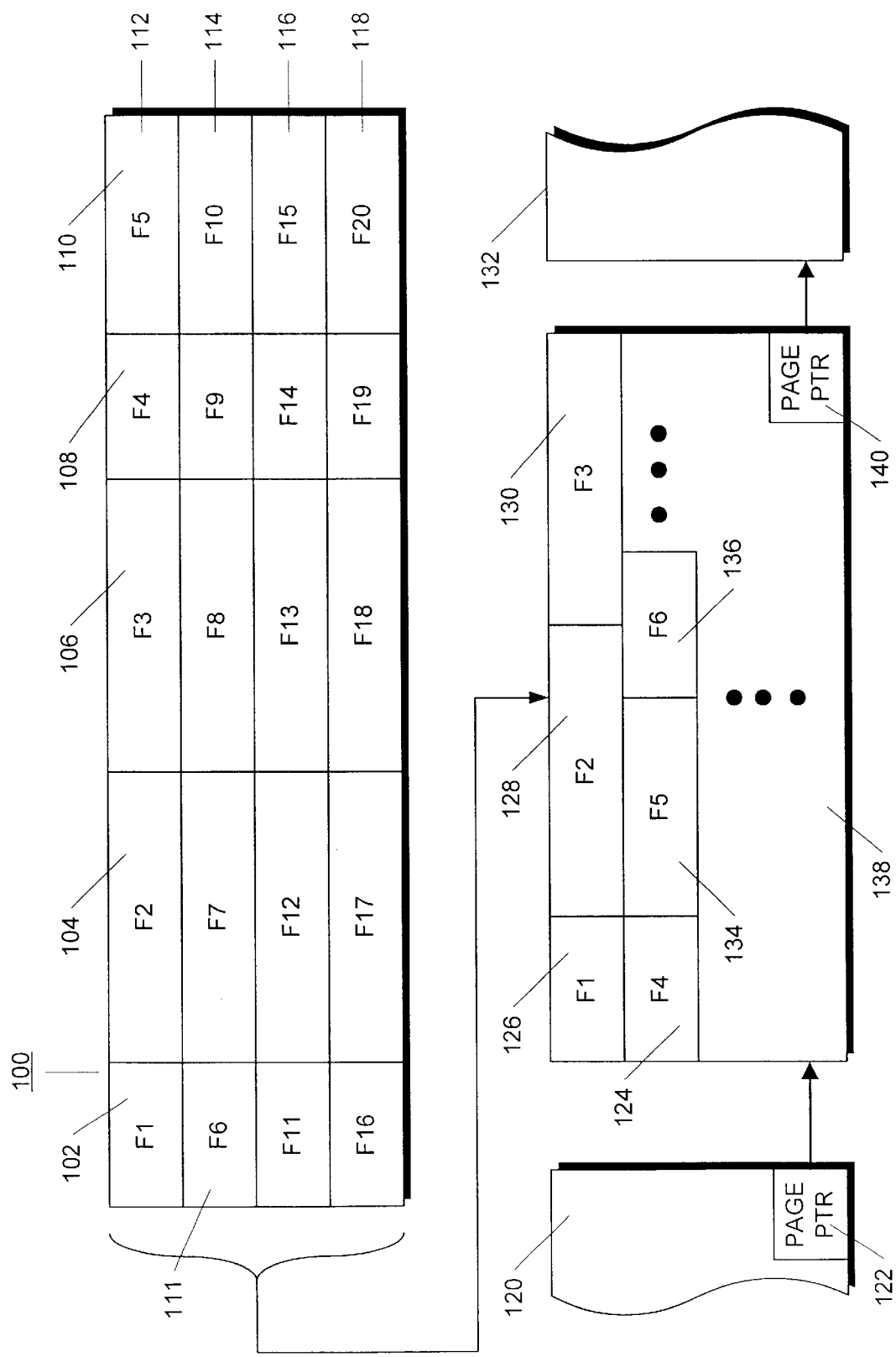
FIG. 1 illustrates, in block schematic form, the relationship of database table rows and data pages in a conventional database system.
Figure 2:
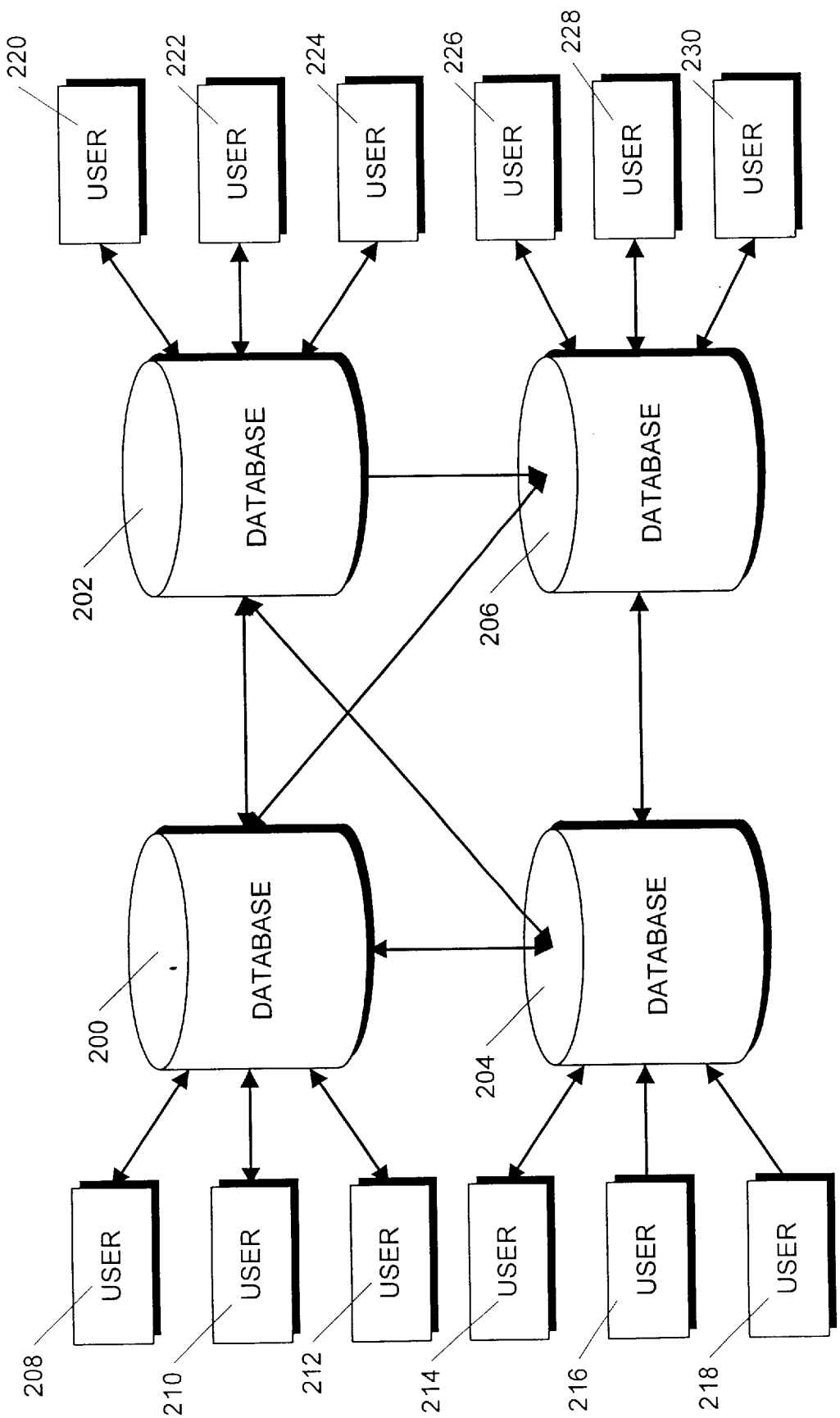
FIG. 2 illustrates, in block schematic form, a distributed database system.

Computer system 500 may further be connected to a network 528 for communication with other computer systems also connected to the network 528 or to Internet connections such as the World Wide Web. The network 528 may be used to implement a distributed database system such as that illustrated in FIG. 2.

Figure 3:
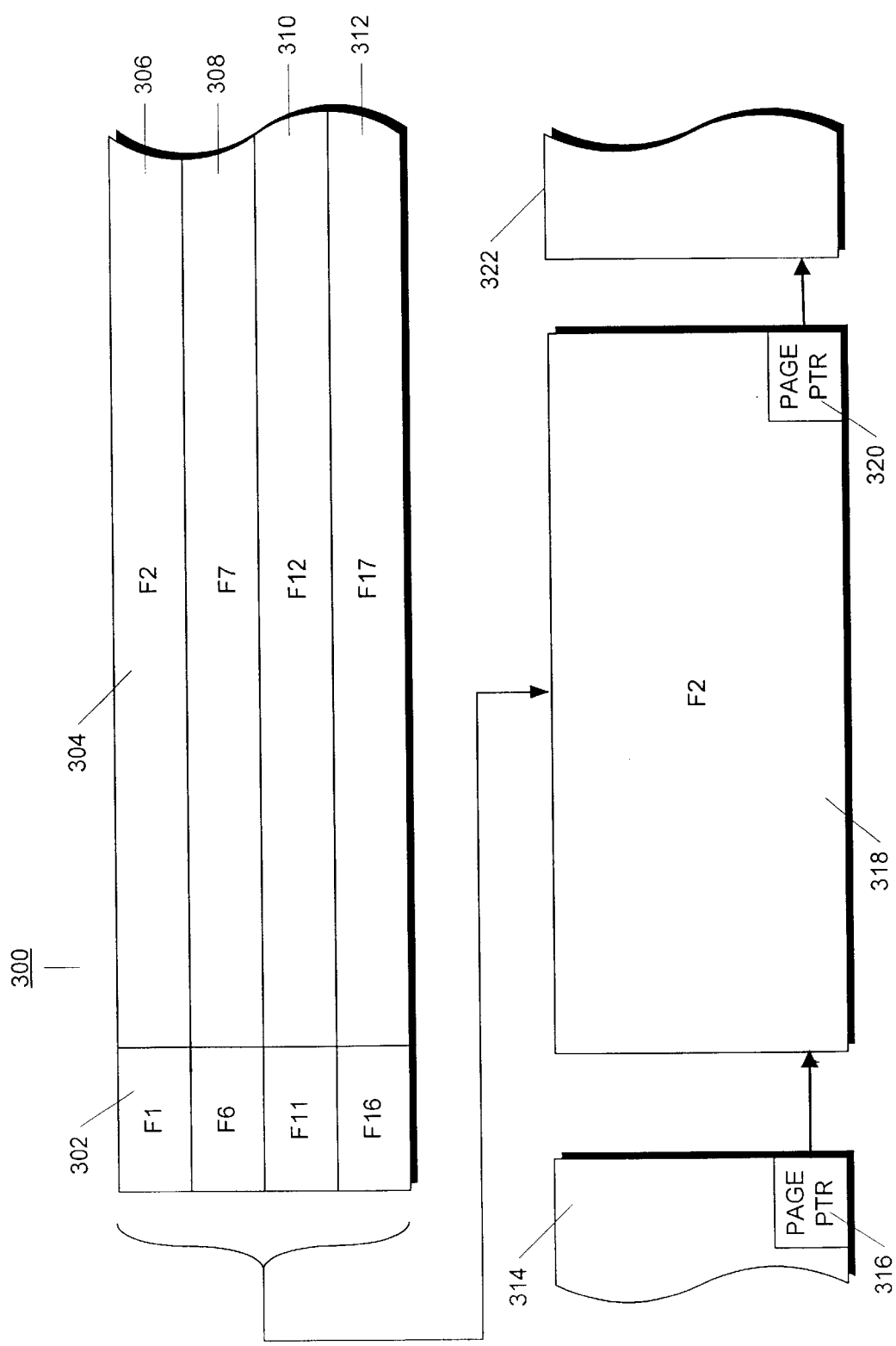
FIG. 3 illustrates, in block schematic form, the relationship of database table rows and data pages in a conventional database system in which large data objects are stored.
Figure 4:
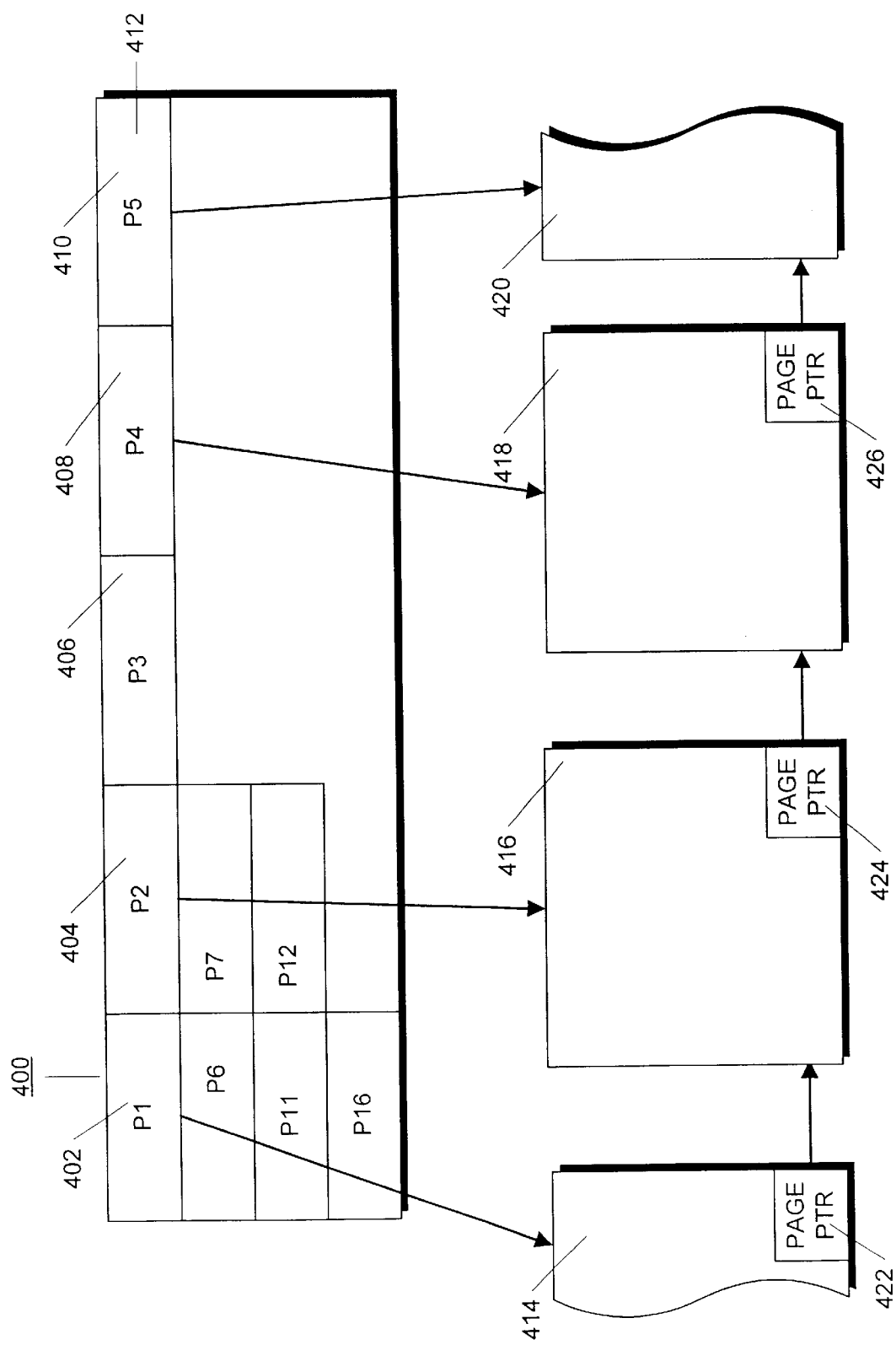
FIG. 4 illustrates, in block schematic form, a space allocation map and its relation to data pages.
Figure 6A:
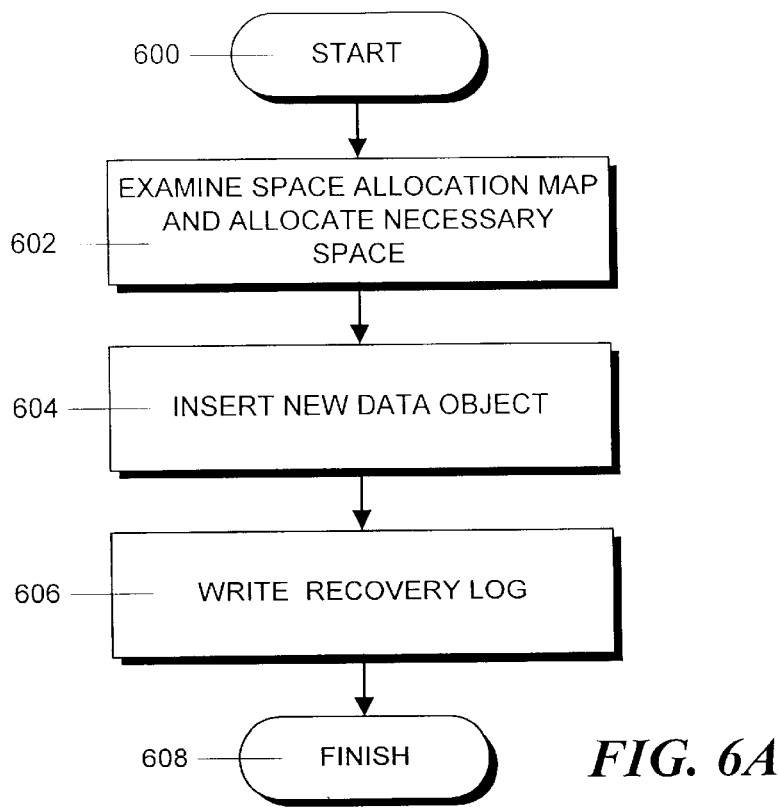
FIGS. 6A and 6B are flow diagrams illustrating the steps in the insertion of a large data object into a table in accordance the principles of the present invention and the deletion of a large data object in accordance with the principles of the present invention.

FIG. 6A illustrates a flowchart of a method for inserting large data objects into a database table as illustrated in FIG. 3 without requiring data recovery logging. In a preferred embodiment, the table is mapped to data pages in such a way that, for large object data, each page contains data for only a single row. In other embodiments, more than one large object may reside on a page. A page that contains large object data may also contain data for other rows representing other objects. In addition, the entire table within the database is either defined with a special logging attribute value of "LOG NO" or, before inserting a large data object, the logging attribute value is altered from a "LOG YES" value to a "LOG NO" value. As previously mentioned, the "LOG NO" attribute value causes the database management system to suspend recovery logging for the related table, but to continue with the logging of control information, such as space management changes. During operation the attribute value can be altered from "LOG NO" to "LOG YES" to allow objects to be entered into, or removed from, the table with logging. The attribute value can be altered by an ALTER LOB TABLESPACE function (for DB2 for OS/390 V6, mentioned above) or another conventional function, which controls an attribute that determines whether recovery logging will be performed.

The routine starts in step 600 and proceeds to step 602, where the page space map is used to locate one or more pages to store the data. In the case of the preferred embodiment, since each page stores large object data for only one row, additional space will be needed for the new table row. For other embodiments, or other non-large objects, space may be found on existing pages. After space has been allocated, a new data object is inserted into the table, for example, a conventional SQL_INSERT method. It is assumed that the table will hold LOBs and the logging attribute has "LOG NO" value set.

After the object has been inserted, the recovery log is written for the changes to the space map in step 606, but not for the data changes. The routine for the data object then ends in step 608.

Figure 6B:
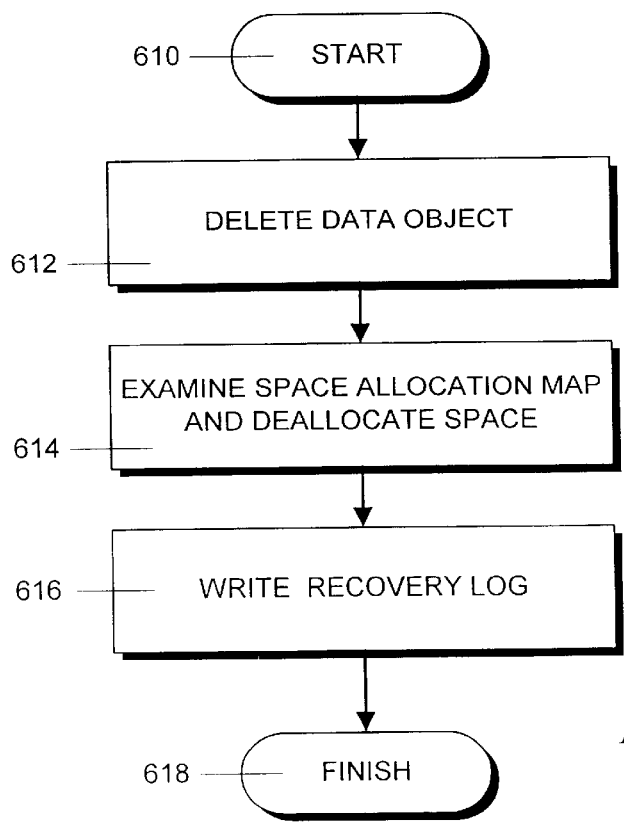

FIG. 6B shows the case of a delete operation. This routine starts in step 610 and proceeds to step 612 in which a large object data is deleted using, for example, a conventional SQL_DELETE statement. However, in accordance with the principles of the invention, the data changes are not logged. In step 614, the space allocation map is examined and the space previously assigned to the object is deallocated and freed. Then, in step 616, the recovery log is written for the changes to the space map in step 614. The routine finishes in step 618. Advantageously, for those database management systems that support parallel load and delete streams, the invention enables inserts and deletes to be conducted in parallel using the normal SQL insert and delete methods.

Figure 7:
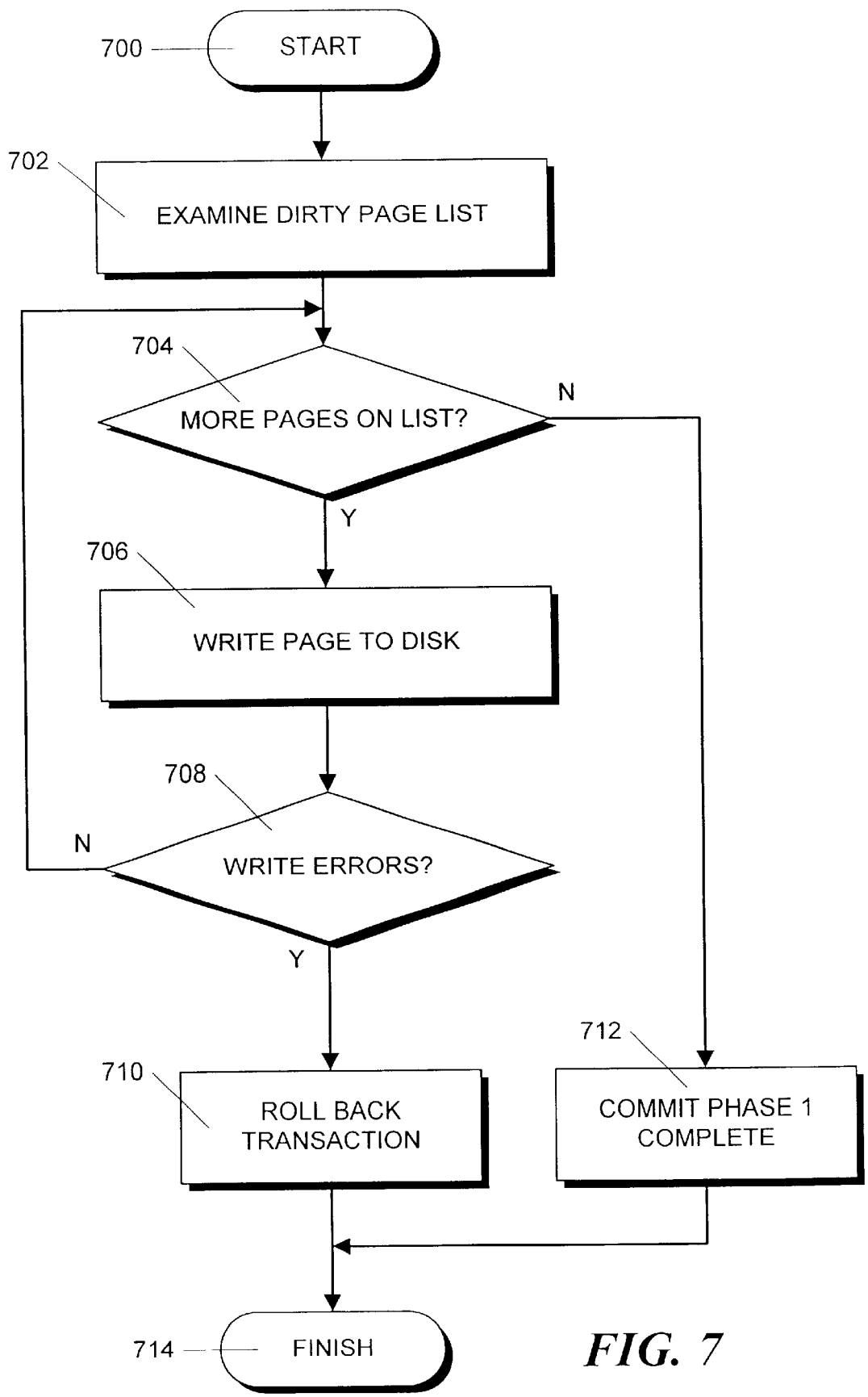
FIG. 7 is a flow diagram illustrating processing of the database pages during a commit phase 1 operation or during a background page flush operation.

In order to insure that the data can be recovered, it is necessary to modify the normal commit phase 1 processing. The modifications are illustrated in FIG. 7 which shows an illustrative routine that writes all changed data pages to disk storage before the end of phase 1 commit in accordance with the principles of the present invention. In particular, this routine starts in step 700 and proceeds to step 702 where the dirty page list is examined to determine if any modified pages exist for the active agent which have not been written to disk. In step 704 if there are any pages on the list, one of the pages is written to disk in step 706. In step 708, a check is made to determine if any errors occurred during the writing process. If any of the changed data pages cannot be written to disk successfully, the routine branches to step 710 in which the application is informed and the transaction is rolled back at all distributed processors and the routine finishes in step 714.

Alternatively, if, in step 708, no write errors are encountered, the routine branches back to step 704 where the dirty page list is checked to determine whether additional pages exist on the list. If so, steps 706 and 708 are repeated, if not, then the routine branches to step 712 where the commit phase 1 is indicated as completed. The routine then finishes in step 714.

Due to limited memory space in the page buffer pool, a database management system may have to write uncommitted modified data back to disk storage before a transaction is committed. Typically, a database management system will dispatch asynchronous write processes to write modified data pages back to disk storage when the number of modified pages in the page buffer pool has reached a predetermined threshold value. These asynchronous write processes are commonly known as "write engines." The conventional asynchronous write engines must be modified so that, when they are writing modified data belonging to the tables defined with LOG NO attributes in accordance with the principles of the current invention, they report back to the transactions that made the updates any error conditions which were caused by write failure conditions. A routine similar to that shown in FIG. 7 can be used for the write process. This allows each transaction to check and ensure all modified data for which no recovery log entries have been written are successfully flushed to disk before signaling that commit phase 1 has completed. If the modified data is not flushed before commit phase 1 ends, then it is possible for the database management system to lose all or part of the committed data if a system or disk failure occurs.

Figure 8:
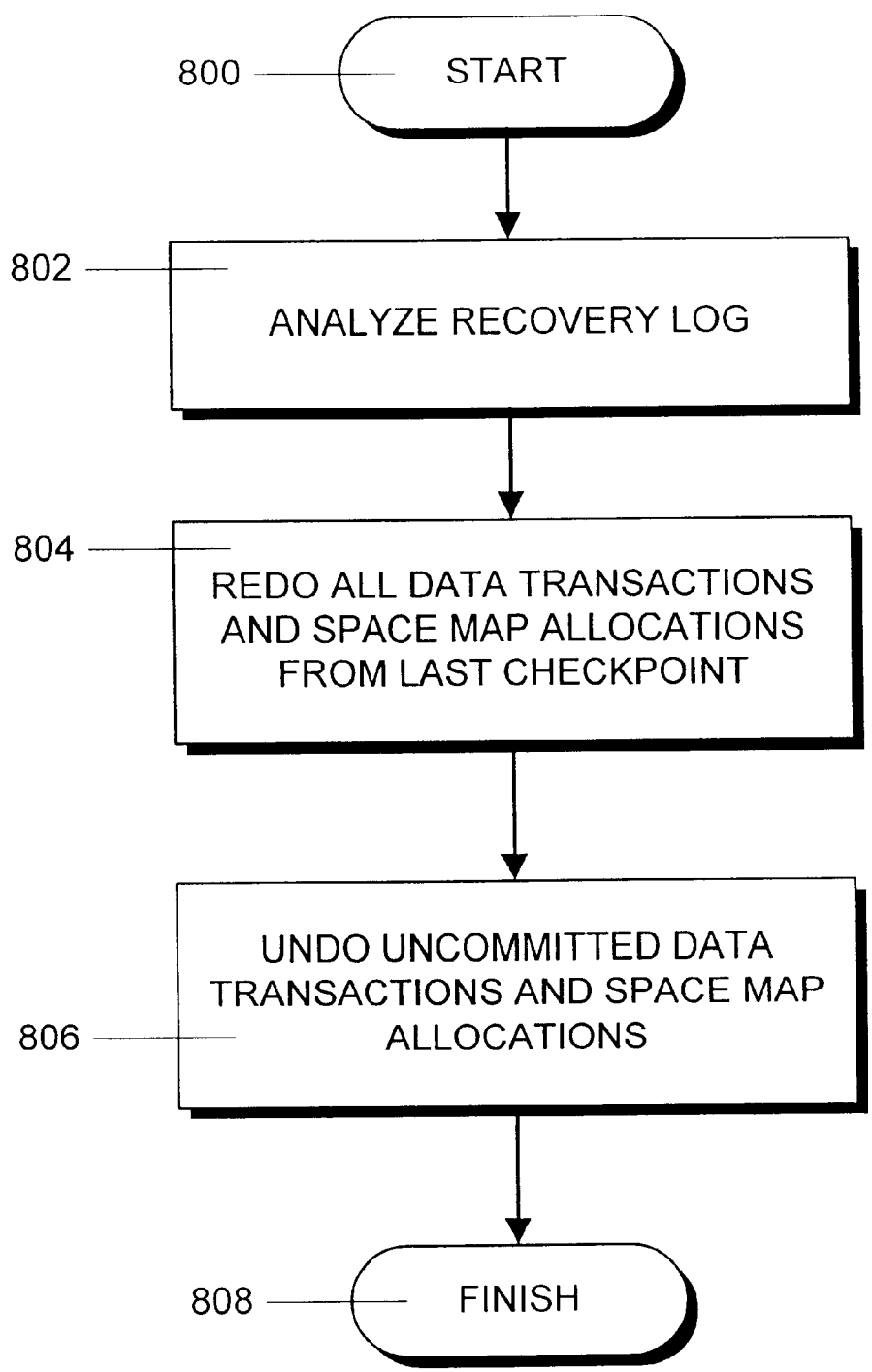
FIG. 8 is a flow diagram illustrating rollback processing which occurs at various times, for example, when database changes cannot be committed.

An illustrative restart routine which implements step 710 is shown in FIG. 8. This restart routine starts in step 800 and proceeds to step 802 where the recovery log is analyzed to determine which transactions were committed prior to restart and which transactions were not committed. Next, in step 804, the recovery log redo information is used by scanning forward from the last checkpoint to reapply changes to all data and control information, such as space map allocations, forward from the last checkpoint or copy.

In step 806, all transactions that were not committed prior to the restart are undone using the undo information in the recovery log. The undone transactions include all uncommitted data transactions and all uncommitted space map allocations. Since, in accordance with the principles of the invention, large data objects have been inserted into the table with the table logging attribute set to NO LOG, no redo and undo recovery log data records will be maintained for these entries. Therefore, during restart, the large objects will not be reentered into the table, but the undo step 806 will remove all space map allocations in order to free the space occupied by the uncommitted insert during the restart operation. The routine then finishes in step 808.

Even if committed, modified data is successfully written back to disk storage during commit phase 1 processing, it is still possible for a database management system to subsequently lose the data if a media failure occurs in the disk storage. Therefore, provisions must be made for backup of the modified data as soon as the insert/delete processes have completed. Without such a backup, the data updated without logging cannot be recovered on a media failure condition. On a media failure scenario, a table defined with the LOG NO attribute can only be recovered to a point when the last backup was taken.

In an alternative embodiment, the system may be implemented as a computer program product for use with a computer system. Such implementation may include a series of computer instructions fixed either on a tangible medium, such as a computer readable media (e.g., a diskette for use in drive 506, a CD for use in CD-ROM drive 508, or non-volatile storage 520 as shown in FIG. 5) or transmittable to a computer system, via a modem or other interface device, such as a network 528. The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it will be apparent to those skilled in the art that various changes and modifications can be made that will achieve some of the advantages of the invention without departing from the true scope of the invention. These and other obvious modifications are intended to be covered by the appended claims.

What is claimed is:

1. A method for use in a computer system having a non-volatile storage and capable of processing a transaction which modifies one or more database pages, comprising:
   (a) writing all modified, unwritten database pages to non-volatile storage before committing the transaction;
   (b) monitoring for errors all write operations which write modified pages to the non-volatile storage; and
   (c) committing the transaction if no errors are detected in step (b) and rolling back the transaction if errors are detected in step (b).

2. The method according to claim 1 further comprising:
   (d) defining the database so that recovery logging will be performed only for control information changes, including space allocation, and not for data changes.

3. The method according to claim 1 further comprising
   (e) backing up the database when the transaction has been completed.

4. The method according to claim 1 wherein the transaction is performed using conventional insert delete and update commands.

5. The method according to claim 1 wherein the computer system comprises a page buffer pool and wherein step (a) comprises:
   (a1) writing all modified, unwritten database pages in the page buffer pool to non-volatile storage before committing the transaction.

6. The method according to claim 5 wherein step (b) comprises:
   (b1) monitoring the write operations performed in step (a) for errors; and
   (b2) monitoring for errors write operations which write modified pages to the non-volatile storage when the page buffer pool contains a predetermined number of modified pages.

7. Apparatus for use in a computer system having a non-volatile storage and capable of processing a transaction which modifies one or more database pages comprising:
   a flushing mechanism which writes all modified, unwritten database pages to non-volatile storage before committing the transaction;
   a monitor which checks for errors all write operations which write modified pages to the non-volatile storage; and
   an updater which commits the transaction if no errors are detected by the monitor and rolls back the transaction if errors are detected by the monitor.

8. The apparatus according to claim 7 further comprising an attribute which defines the database so that recovery logging will be performed only for space allocation purposes.

9. The apparatus according to claim 7 further comprising a backup mechanism which backs up the database when the transaction has been completed.

10. The apparatus according to claim 7 wherein the transaction is performed using conventional insert, delete and update commands.

11. The apparatus according to claim 7 wherein the computer system comprises a page buffer pool and wherein the flushing mechanism comprises a first storage mechanism which writes all modified, unwritten database pages in the page buffer pool to non-volatile storage before committing the transaction.

12. The apparatus according to claim 11 wherein the monitor comprises a first monitoring mechanism which monitors the write operations performed by the flushing mechanism and a second monitoring mechanism which monitors for errors write operations which write modified pages to the non-volatile storage when the page buffer pool contains a predetermined number of modified pages.

13. A computer program product for use in a computer system having a non-volatile storage and capable of processing a transaction which modifies one or more database pages, the computer program product comprising a computer usable medium having computer readable program code thereon, including:
   program code for writing all modified, unwritten database pages to non-volatile storage before committing the transaction;
   program code for monitoring for errors all write operations which write modified pages to the non-volatile storage; and
   program code for committing the transaction if no errors are detected by the monitoring program code and rolling back the transaction if errors are detected by the monitoring program code.

14. The computer program product according to claim 13 further comprising an attribute defining the database so that recovery logging will be performed only for control information changes, including space allocation, and not for data changes.

15. The computer program product according to claim 13 further comprising
   (e) backing up the database when the transaction has been completed.

16. The computer program product according to claim 13 wherein the transaction is performed using conventional insert, delete and update commands.

17. The computer program product according to claim 13 wherein the computer system comprises a page buffer pool and wherein the writing program code comprises program code for writing all modified, unwritten database pages in the page buffer pool to non-volatile storage before committing the transaction.

18. The computer program product according to claim 17 wherein the monitoring program code comprises program code for monitoring the write operations performed by the writing program code for errors and program code for monitoring for errors write operations which write modified pages to the non-volatile storage when the page buffer pool contains a predetermined number of modified pages.

19. A method for use in a computer system having a non-volatile storage and capable of processing a transaction which modifies one or more database pages comprising:

(a) disabling data recovery logging for the database;

(b) inserting the large object into the database and logging resulting changes to the space allocation map in a recovery log;

(c) writing all modified, unwritten database pages to non-volatile storage before committing the large object insertion;

(d) monitoring for errors all write operations which write modified pages to the non-volatile storage; and (e) committing the large object insertion if no errors are detected in step (d) and rolling back the large object insertion if errors are detected in step (d).

20. The method according to claim 19 further comprising:

(f) using the changes to the space allocation map in the recovery log to delete the large object from the database on a rollback when the large object insertion was uncommitted.

21. The method according to claim 19 wherein the large object insertion is performed using a conventional insert command.

22. The method according to claim 19 wherein the computer system comprises a page buffer pool and wherein step (c) comprises:

(c1) writing all modified, unwritten database pages in the page buffer pool to non-volatile storage before committing the large object insertion.

23. The method according to claim 22 wherein step (d) comprises:

(d1) monitoring the write operations performed in step (c) for errors; and (d2) monitoring for errors write operations which write modified pages to the non-volatile storage when the page buffer pool contains a predetermined number of modified pages.

24. A method for use in a computer system having a non-volatile storage and capable of processing a transaction which modifies one or more database pages comprising:

(a) disabling data recovery logging for the database;

(b) deleting the large object from the database and logging resulting changes to the space allocation map in a recovery log;

(c) writing all modified, unwritten database pages to non-volatile storage before committing the large object deletion;

(d) monitoring for errors all write operations which write modified pages to the non-volatile storage; and (e) committing the large object deletion if no errors are detected in step (d) and rolling back the large object deletion if errors are detected in step (d).

25. The method according to claim 24 further comprising:

(f) using the changes to the space allocation map in the recovery log to reallocate space allocated to the large object from the database on a rollback when the large object deletion was uncommitted.

26. The method according to claim 24 wherein the large object deletion is performed using a conventional delete command.

27. The method according to claim 24 wherein the computer system comprises a page buffer pool and wherein step (c) comprises:

(c1) writing all modified, unwritten database pages in the page buffer pool to non-volatile storage before committing the large object deletion.

28. The method according to claim 27 wherein step (d) comprises:

(d1) monitoring the write operations performed in step (c) for errors; and (d2) monitoring for errors write operations which write modified pages to the non-volatile storage when the page buffer pool contains a predetermined number of modified pages.

* * * * *